No. 890,234. PATENTED JUNE 9, 1908.
J. T. JONES.
METHOD OF TREATING IRON ORES.
APPLICATION FILED MAR. 10, 1908.
2 SHEETS—SHEET 2.
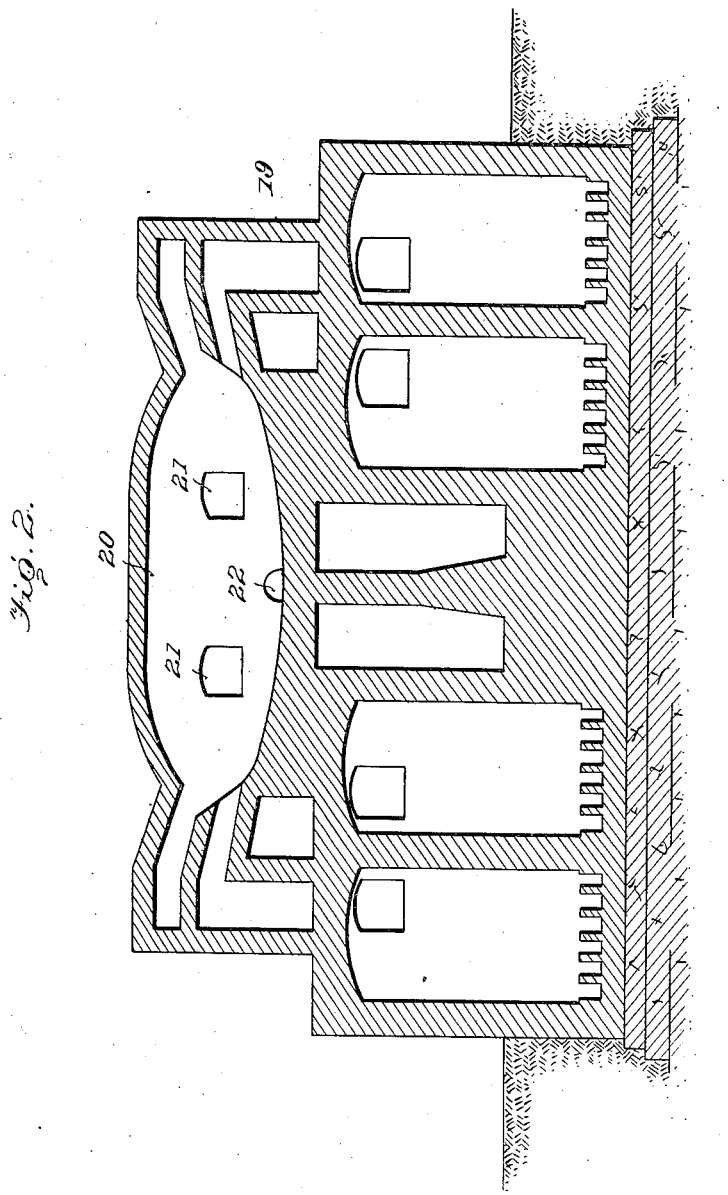
Witnesses
Inventor
John T. Jones

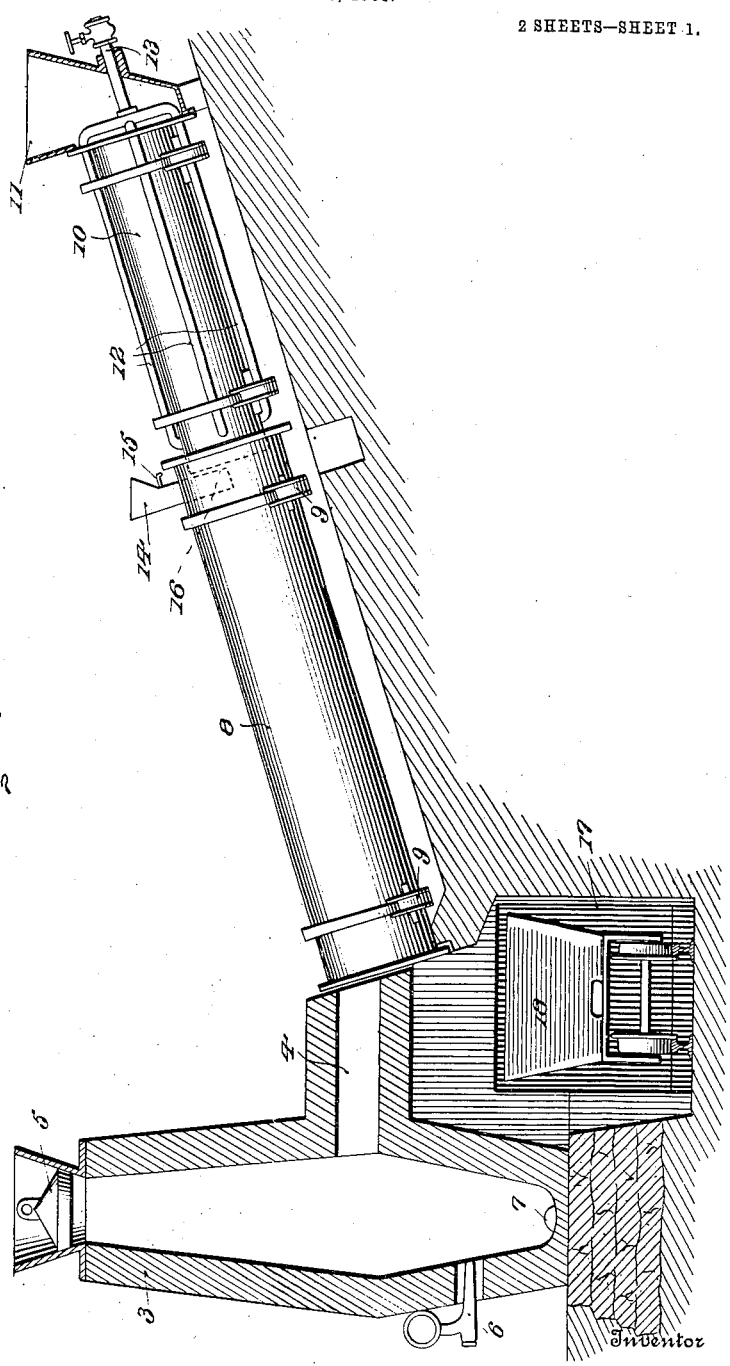

UNITED STATES PATENT OFFICE.

JOHN T. JONES, OF IRON MOUNTAIN, MICHIGAN, ASSIGNOR OF ONE-HALF TO GEORGE A. ST. CLAIR, OF DULUTH, MINNESOTA.

METHOD OF TREATING IRON ORES.

No. 890,234.   Specification of Letters Patent.   Patented June 9, 1908.

Application filed March 10, 1908. Serial No. 420,272.

*To all whom it may concern:*

Be it known that I, JOHN T. JONES, citizen of the United States, residing at Iron Mountain, in the county of Dickinson and State of Michigan, have invented certain new and useful Improvements in Methods of Treating Iron Ores, of which the following is a specification.

My invention relates to improvement in steps of manufacturing merchantable iron from oxid of iron ores, and, more especially, to improvement in the method of deoxidizing the ore for the purpose of producing a sponge iron of exceptional purity for further treatment.

In the well-known blast furnace practice the ore mixture is subjected, first, to a reducing action, which converts the iron oxid into metallic iron, and then to a melting action, which renders all the constituents of the ore fluid and enables the iron to separate from the slag by gravity. The resultant product, known as pig iron, is rarely, in any case, above something under 95% pure, the remainder being generally, for the most part, silicon and carbon, with a smaller percentage of other impurities, notably phosphorus, sulfur and manganese.

My object is not only to obtain a more nearly pure iron product from the ore than is obtainable by the usual smelting operation as practiced, but to enable its production in furnaces of comparatively simple and inexpensive construction at less expense in fuel and fluxes.

In carrying out my process I subject the ore first to the action of hot reducing gases at a temperature sufficiently high and for a time sufficiently prolonged to reduce iron oxids to the metallic state, without, however, rendering the metallic iron or slag producing constituents fluid. During this action, the reduced iron particles agglomerate into a more or less honeycombed structure, leaving the slag producing constituents, for the most part, in mechanical union therewith. I then subject the reduced ore to the action of gases, which may be neutral in the sense of being neither oxidizing nor reducing, at a temperature sufficiently high and for a period sufficiently prolonged to melt the slag-producing constituents of the ore, but not metallic iron, whereby the fluid slag-producing constituents will flow by gravity from the iron, leaving the latter in a pure, or nearly pure, condition. The resultant sponge iron may then be separately treated under a still higher temperature and balled up or melted down entirely and run off into ingots or blooms.

Both classes of iron ore may be treated by my improved process, namely, those which are self-fluxing, and those which require the admixture of a fluxing material such as lime, or alumina; and it is desirable of course to have a mass, or ore mixture, the slag-producing constituents of which will be formed into slag at a comparatively low temperature, say under 2200° F. I have discovered that by leaving a material amount of iron oxid with the slag making constituents of the mass at the end of the reducing step of my process the melting point of the slag is greatly reduced. In other words I am enabled to melt the slag making constituents at a comparatively low temperature but at a sacrifice of iron oxids, which enter into the composition of the slag. This loss is not very material when my process is practiced in the neighborhood of where the ore is mined, and produces a great saving in fuel consumption. If it should be found that at the end of the reducing step of my process an insufficient amount of oxid of iron is present in the mass, I may mix a small amount of oxid of iron therewith, or partially oxidize the mass before subjecting it to the next step wherein the slag is formed without melting the metallic iron.

In the carrying out of my improved method on a commercial scale, a suitably constructed furnace, or series of furnaces, must necessarily be provided, and, for the purpose of illustration merely, and without intending thereby to limit the scope of my invention to the employment of any particular type of apparatus, I show in the accompanying drawings furnace structures which will answer the purpose of rendering clear the description of the steps of my improved method as I prefer to practice them.

Referring to the drawings—Figure 1 is a view partly in side elevation and partly in section of a furnace structure adapted for carrying out the first steps of my improved method; and Fig. 2, a sectional view of a reverberatory open-hearth furnace of common construction which may be employed for carrying on the final steps of the method.

The furnace 3 for the production of reducing gas is provided with a gas-outlet flue 4. Fuel, such as bituminous coal, is fed thereto through a bell-valve 5, and air to support combustion is forced in through the twyer 6. The unvolatilized products of the fuel may be drawn through the opening 7. An inclined rotary cylinder 8 abuts gas-tight against the mouth of the flue 4 and is supported upon rollers 9 in a common manner. The cylinder 8, in practice, may be, say, one hundred or more feet in length. 10 is a second cylinder forming, in effect, a continuation of the cylinder 8 and similarly mounted to rotate therewith. The upper open end of the cylinder 10 enters the lower part of a stationary ore-feeding hopper 11, the joint between them being gas-tight. Air-supplying pipes 12 enter the lower end-portion of the cylinder 10 and lead thereto from a common air-supply pipe 13. On the upper end-portion of the cylinder 8 is a hopper 14 provided with a valve 15, the hopper communicating with a pipe 16 which terminates at about the axial center of the cylinder. Below the lower open end of the cylinder 8 is a pit 17 into which cars 18 may be run to receive the material discharged from the cylinder 8.

The reducing gases generated in the furnace 3 pass through the flue 4 into the lower end of the cylinder 8, and, when they reach the cylinder 10, they are mixed with air from the pipes 12, giving to the gases an excess of oxygen. All the gases escape through the hopper 11. The cylinders have means, not shown, for rotating them slowly, and the ore fed through the hopper 11 descends slowly to the lower end of the cylinder 8. In its passage through the cylinder 10, the ore is subjected to an oxidizing atmosphere which tends to drive off sulfur and heat the ore to a high temperature. While descending through the cylinder 8, the ore is subjected to a reducing atmosphere which is maintained at a temperature sufficiently high to reduce the desired percentage of the iron oxids to metal, without, however, rendering either the metallic iron or slag producing constituents of the ore fluid.

The temperature of the gases passing through the cylinders is regulated within reasonable limits to produce the results I wish to obtain. Occasionally, as desired, I feed a more or less limited quantity of preferably bituminous coal into the upper end of the cylinder 8 through the valved hopper 14. As the ore passes through the upper end-portion of the cylinder 8, it is subjected to a reducing temperature which does not, however, reach that necessary to bind phosphorus to the metal. It is, however, high enough to free the volatiles from the hydrocarbon fuel fed through the hopper 14, and these volatiles mixed with the reducing gases from the furnace 3 tend to combine with any phosphoric acid in the ore and carry it off. Thus the ore as it descends through the cylinder 8 is not only reduced, but largely, at least, dephosphorized.

As the iron oxids are reduced to the metallic state, the reduced metal particles tend to agglomerate together and form structures of honeycomb form, while the other constituents of the ore adhere to, or become enveloped in, the interstices of lumps. After the ore reaches this sponged condition, it is discharged into the car 18. Care should be employed to prevent the entrance of a material quantity of air to the pit 17 when the cars are moved in and out, and to prevent air from entering the lower end of the cylinder 8 in volume sufficient to deteriorate the reducing gases entering the cylinder from the flue 4. When a car 18 is filled with reduced ore, its contents may be covered with coal-dust or the like, to exclude the atmosphere and prevent reoxidation of the ore.

To carry out the next step of my method the reverberatory open-hearth furnace 19 may be employed, the contents of the car 18 being dumped into the melting chamber 20, which is provided with the doors 21 and a tap-opening 22. Here the ore is subjected, for a period sufficiently prolonged, to the action of hot gases, preferably of a substantially neutral nature, at a temperature approximating, say, 2000° to 2200° F. which will melt and render fluid the slag making constituents. The slag thus formed will separate from the iron, and may be removed as by running it out of the tap hole 22. This operation may be kept up until practically all the slag-making constituents have separated from the iron, care being employed that the temperature is not raised to the point where the metallic iron, during the practice of this step of the method, will become fluid. When all, or as much as desired, of the slag-making constituents have thus become melted out of, and separated from, the iron as described, the iron remaining in the chamber 20 may be subjected to a higher temperature and balled up or melted to the fluid state, and then run off into ingots, blooms, or other products.

The iron, when removed from the melting chamber, is very pure and also possesses the advantage of being completely, or almost completely, dephosphorized.

I prefer to carry out my method in at least two furnaces as described, because in that way I obtain better heat-control than can be accomplished, on a commercial scale, in any single furnace structure of which I am aware. However, I do not limit my invention in any way to the particular apparatus in which the steps of the method are carried on.

What I claim as new, and desire to secure by Letters Patent, is—

1. The method of treating iron ore, which consists in first subjecting the ore, under deoxidizing conditions, to a temperature that will reduce iron oxids to metallic iron in sponge-form without rendering the slag-making constituents fluid, then subjecting the reduced ore to a higher temperature to render fluid the slag-making constituents but not the metallic iron, and causing the molten material to free itself by gravity, then separating the slag and unmelted iron.

2. The method of treating iron ore, which consists in first subjecting the ore, under deoxidizing conditions, to a temperature that will free the phosphoric acid without binding it to the iron, then to a temperature of a degree and for a period sufficient to reduce iron oxids to metallic iron in sponge-form without rendering the slag-making constituents fluid, then subjecting the reduced ore to a higher temperature to render fluid the slag-making constituents but not the metallic iron, and causing the molten material to free itself by gravity, then separating the slag and unmelted iron.

3. The method of treating iron ore, which consists in first subjecting the ore, under deoxidizing conditions, to a temperature that will reduce iron oxids to metallic iron in sponge-form without rendering the slag-making constituents fluid, then subjecting the reduced ore to a higher temperature to render fluid the slag-making constituents but not the metallic iron, and causing the molten material to free itself by gravity, then removing the slag and subjecting the iron to a still higher temperature, for the purpose set forth.

4. The method of treating iron ore, which consists in first subjecting the ore, under deoxidizing conditions, to a temperature that will reduce iron oxids to metallic iron in sponge-form without rendering the slag-making constituents fluid, then subjecting the reduced ore to a higher temperature to render fluid the slag-making constituents but not the metallic iron, and causing the molten material to free itself by gravity, then removing the slag and subjecting the iron to a melting temperature to render it fluid.

5. The method of treating iron ore, which consists in first subjecting the ore under deoxidizing conditions to a temperature that will reduce iron oxids to metallic iron, without rendering the slag making constituents fluid, then subjecting the reduced ore with a small percentage of oxid of iron, to a higher temperature to render fluid the slag making constituents without melting the metallic iron, the oxid of iron uniting with the other slag making constituents to reduce the melting point of the slag.

6. The method of treating iron ore which consists in first subjecting the ore under deoxidizing conditions to a temperature that will reduce iron oxids to metallic iron, stopping the deoxidizing action before the same is complete, whereby a small portion of the iron oxid will remain, then subjecting the mass to a higher temperature to render fluid the slag making constituents without melting the metallic iron, the oxid of iron uniting with the other slag making constituents to reduce the melting point of the slag.

In testimony whereof I affix my signature in presence of two witnesses.

JOHN T. JONES.

Witnesses:
J. W. DYRENFORTH,
FRANCIS M. PHELPS.